United States Patent [19]

Chen

[11] Patent Number: 5,594,589

[45] Date of Patent: Jan. 14, 1997

[54] ZOOM-LENS STRUCTURE FOR A CAMERA

[75] Inventor: Jim Chen, Taipei, Taiwan

[73] Assignee: Industrial Technology Research Institute, Hsinchu, Taiwan

[21] Appl. No.: 237,113

[22] Filed: May 3, 1994

[51] Int. Cl.⁶ .................................................. G02B 7/02
[52] U.S. Cl. .............................. 359/826; 359/829
[58] Field of Search ................... 359/822, 829, 359/826

[56] References Cited

U.S. PATENT DOCUMENTS

| | | | |
|---|---|---|---|
| 3,122,079 | 2/1964 | Mahn | 359/826 |
| 4,154,510 | 5/1979 | Katagiri | 359/826 |
| 4,336,979 | 6/1982 | Hamatani | 359/826 |
| 4,514,039 | 4/1985 | Kawai | 359/826 |
| 5,052,781 | 10/1991 | Iizuka | 359/823 |

*Primary Examiner*—Georgia Y. Epps
*Assistant Examiner*—Thomas Robbins
*Attorney, Agent, or Firm*—W. Wayne Liauh

[57] ABSTRACT

A zoom-lens structure for a camera is disclosed which comprises at least an outer cylinder, an inner cylinder, a fastening ring and a lens mount assembly. The outer cylinder has a plurality of straight grooves for engaging with a plurality of projected keys, respectively, provided on a fastening ring so as to allow the fastening ring to be movably mounted outside the inner cylinder. The lens mount assembly includes a first lens mount and a second lens mount, and the fastening ring has at least two first positioning pieces to be engaged with positioning grooves provided on the second lens mount so as to limit the second lens mount from rotating. At least two second positioning pieces are provided on the first lens mount which are also engaged with the positioning grooves and are thus controlled by the second lens mount from being able to rotate. This arrangement controls the entire lens mount assembly to move back and forth along an optical axis to provide a zoom lens function. In a preferred embodiment, the inner surface of the inner cylinder is furnished with a plurality of curved grooves for receiving corresponding rolling balls, respectively, provided on outer surfaces of the first lens mount and the second lens mount. The zoom-lens structure so disclosed allows the focal length to be varied with only three cylinders having relatively small diameters without affecting the retracting length of the lens assembly.

4 Claims, 5 Drawing Sheets

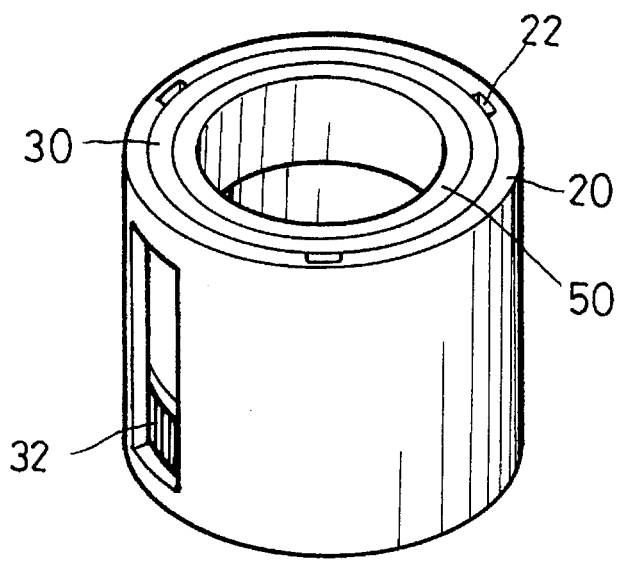
F I G. 4
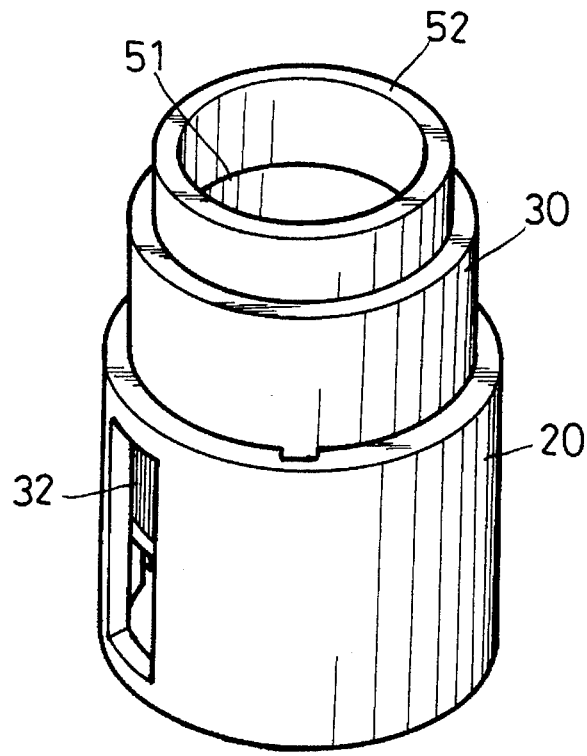
F I G. 5

ZOOM-LENS STRUCTURE FOR A CAMERA

BACKGROUND OF THE INVENTION:

Currently, two-lens cameras have been designed by following two trends, i.e., a zoom-lens model and a small-sized model. Both of these models have become highly demanded products in the market. Generally, the zoom-lens model has been classified into two categories according to the operation of its movable elements, i.e., the optical compensation type and the mechanical compensation type. The mechanical compensation type of zoom lens tends to have a smaller size than that of the optical compensation type, and therefore it has become a popular requirement for a zoom-lens camera to have a light weight, and a thin and small size.

In U.S. Pat. Nos. 5,144,493, the pertinent parts of which are shown and 5,144,493 as shown in FIG.1, it is illustrated a conventional mechanical compensation type of zoom-lens, which comprises a lens mount assembly 10 having a first lens mount 11, and a second lens mount 12, a straight-slot cylinder 13, an inner cylinder 14, and an outer cylinder 15. In other words, the zoom-lens includes four cylinders. The inner cylinder 14 is provided with a plurality of curved slots 140 to provide a variable distance between the first lens mount 11 and the second lens mount 12, so as to keep a focal plane at a desired position. The straight-slot cylinder 13 is used for limiting the optical parts in the lens mount assembly 10 to move back and forth along a straight line.

In the aforesaid mechanical compensation type of zoom-lens, the first and second lens mounts 11 and 12 of the lens mount assembly 10 have to move back and forth along a straight line. Therefore, both the straight-slot cylinder 13 and the inner cylinder 14, are required. As a result, it is impossible to minimize the diameter of the lens is unable to minimize to a break-through level because of the requirement of having too many cylinders therein.

SUMMARY OF THE INVENTION

The prime object of the present invention is to provide a zoom-lens structure for a camera, in which a fastening ring and a plurality of straight slots of the outer cylinder are used to replace the function of the straight-slot cylinder of a conventional zoom lens. The fastening ring is movably mounted on the inner cylinder. The outer cylinder is used to limit the fastening ring from rotation, and the fastening ring is used to limit the lens mounts of the lens mount assembly to move back and forth only, without rotation, so as to reduce the number of cylinder required, and reduce the size of the zoom lens assembly.

BRIEF DESCRIPTION OF THE DRAWINGS

FIG. 4 is a perspective view of the zoom lens assembly according to the present invention.

FIG. 5 is a perspective view of the zoom lens assembly according to the present invention, showing the operation thereof.

DETAILED DESCRIPTION

Figure 1:
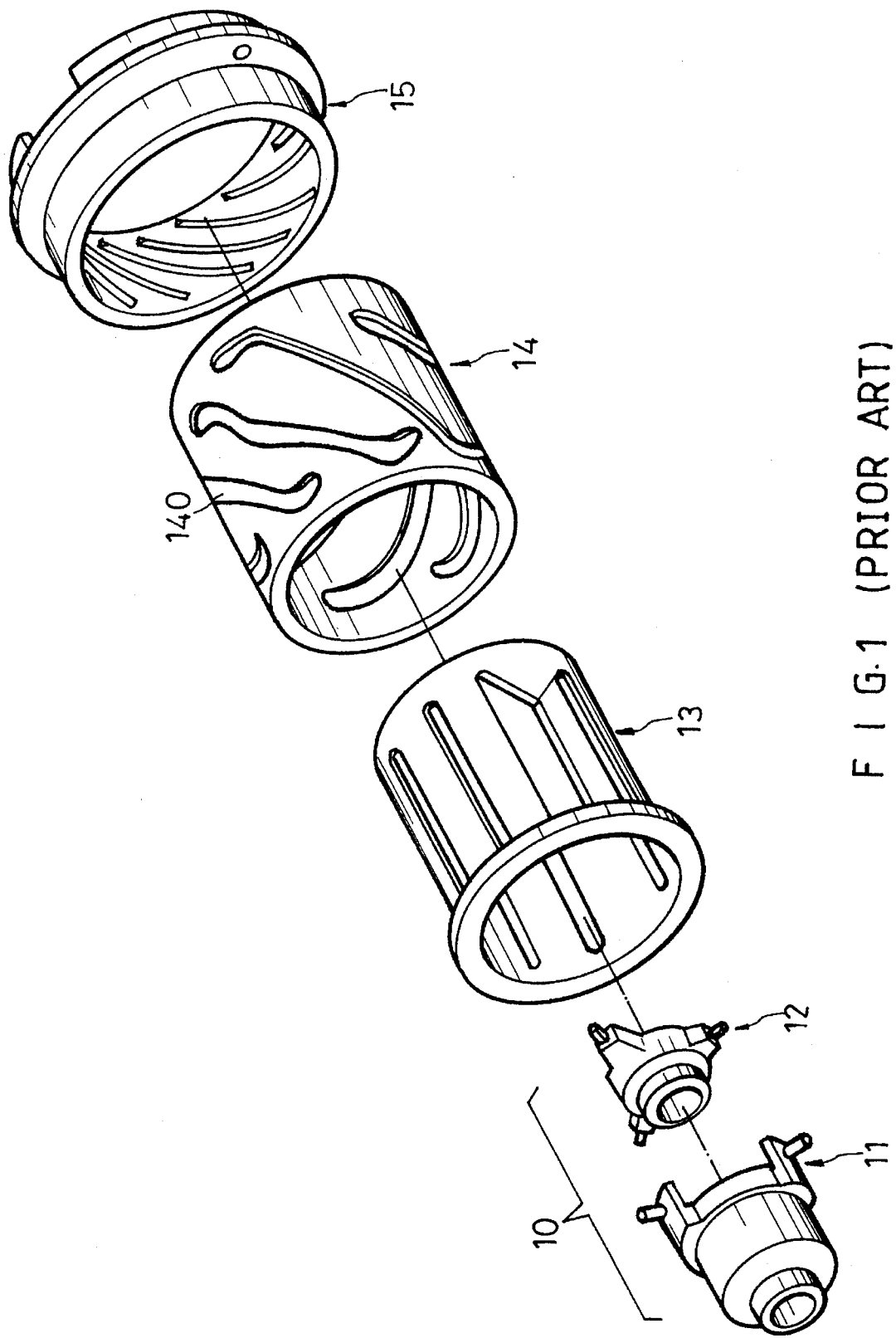
FIG. 1 is a disassembled view of a conventional zoom lens assembly.
Figure 2:
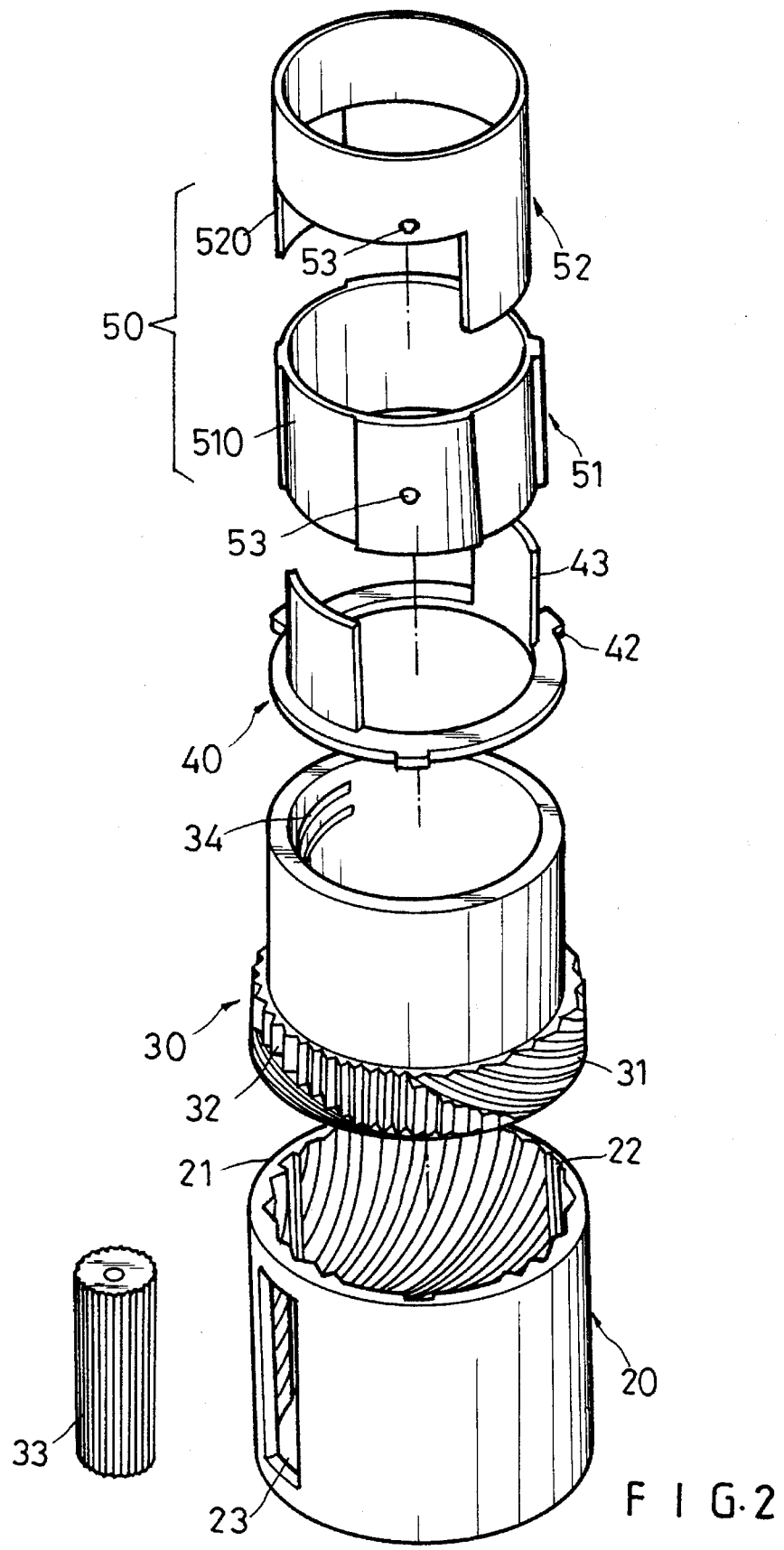
FIG. 2 is a disassembled view of a zoom lens assembly according to the present invention for a camera.
Figure 3:
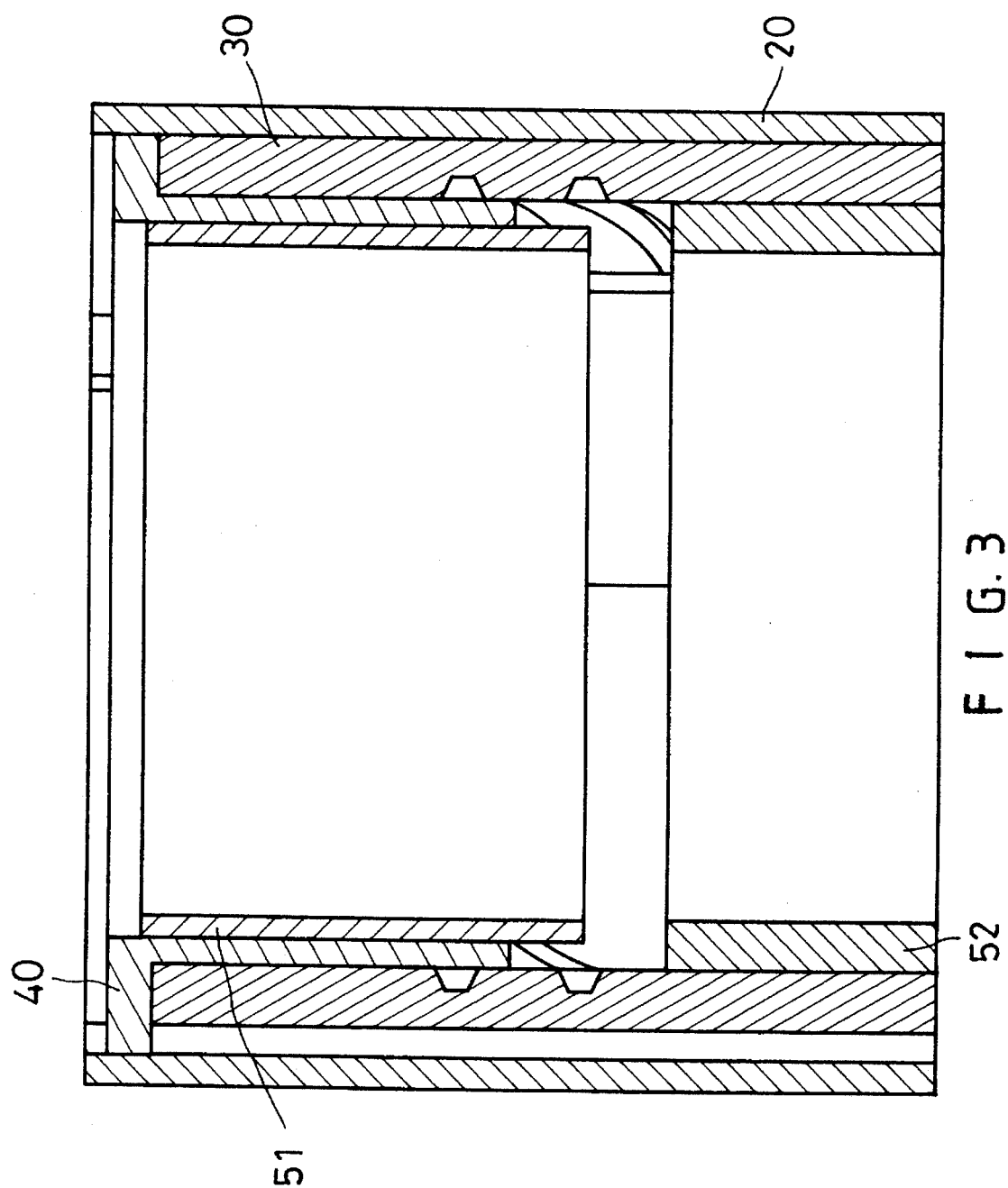
FIG. 3 is a sectional view of the zoom lens assembly according to the present invention.

Referring to FIGS. 2 and 3, the embodiment of the present invention comprises an outer cylinder 20, an inner cylinder 30, a fastening ring 40 and a lens mount assembly 50. The inner surface of the outer cylinder 20 has a plurality of female threads 21 and straight grooves 22; one side of the outer cylinder 20 has an elongated slot 23. The inner cylinder 30 is movably retained in place with the fastening ring 40, i.e., being retained in the outer cylinder 20 by means of the oblique thread portion 31 thereof and the female threads 21 in the outer cylinder 20. The ring edge 41 of the fastening ring 40 is provided with a given number of projected keys 42 corresponding to that of the straight grooves 22 furnished on the inner surface of the outer cylinder 20. The lower outer surface of the inner cylinder 30 is furnished with a vertical gear portion 32, whereby the inner cylinder 30 can be driven to move by means of a driving gear 33 through an elongated slot 23 of the outer cylinder 20.

In addition to the projected keys 42, the fastening ring 40 is furnished with two positioning pieces 43 to be mated with the corresponding positioning grooves 510 on the second lens mount 51 of the lens mount assembly 50. The positioning grooves 510 are also engaged with the positioning pieces 520 of the first lens mount 52. Rolling balls 53a and 53b on the first and second mounts 52 and 51, respectively, are to be engaged movably in the curved grooves, 34a and 34b, respectively, provided on the inner surface of the inner cylinder 30.

When the driving gear 33 drives the inner cylinder 30 to rotate inside the outer cylinder 20, the first lens mount 52 and the second lens mount 51 would not rotate because the fastening ring 40 is limited by the straight grooves 22 in the outer cylinder 20, and that the lens mount assembly 50 inside the inner cylinder 30 is limited with the fastening ring 40. But the whole lens mount assembly 50 will move back and forth along an optical axis so as to provide a zoom lens function.

Referring to FIGS. 4 and 5, the present invention can provide a two-stage zoom lens, i.e., the inner cylinder 30 and the outer cylinder 20 can provide a first stage retraction, while the lens mount assembly 50 and the inner cylinder 30 can provide a second stage retraction.

The zoom-lens structure accordingly to the present invention can vary the focal length with only three cylinders having smaller diameters, without affecting the retracting length of the lens assembly.

Figure 6:
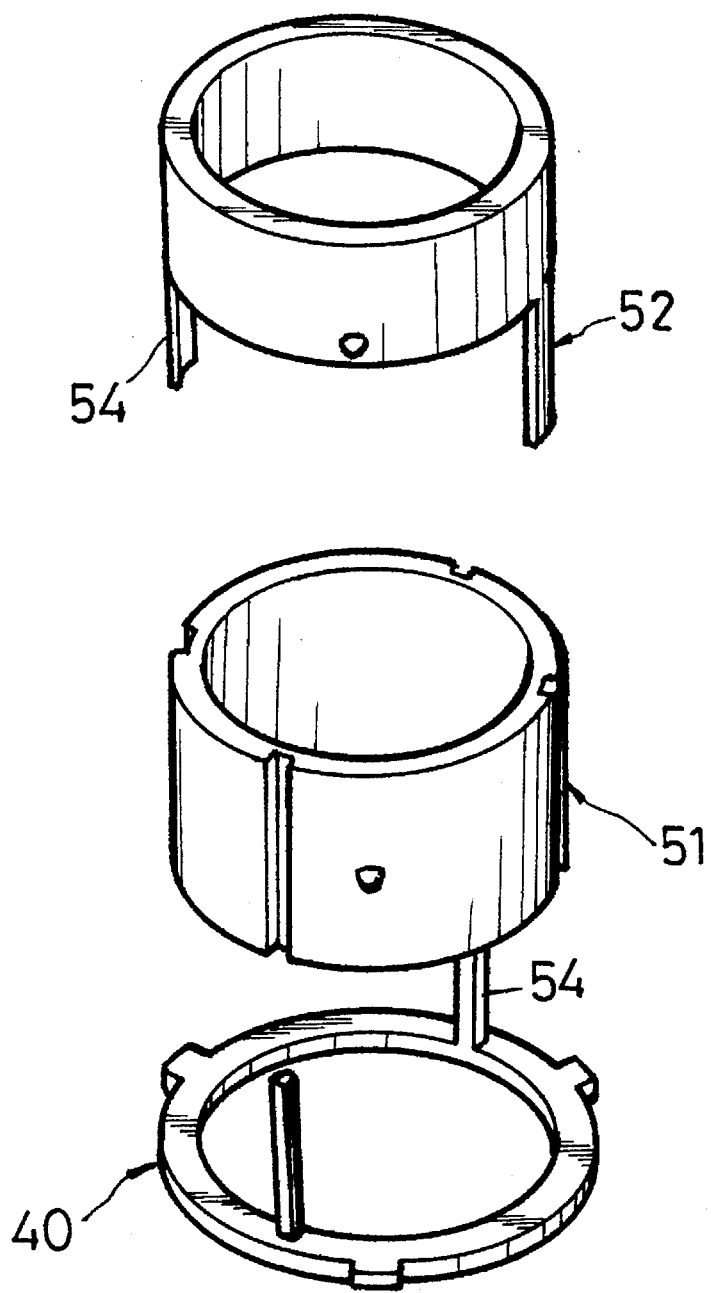
FIG. 6 is a disassembled view of another embodiment of a zoom lens assembly according to the present invention.

Moreover, the positioning groove 510 of the second lens mount 51 can also be designed into an elongated slot ( as shown in FIG. 6 ), while the fastening ring 40 and the first lens mount are furnished with two positioning rods 54 and two corresponding positioning grooves respectively so as to provide limitation function.

In brief, the zoom lens structure according to the present invention is deemed a novel structure being never shown in the current market, and a practical invention with high industrial value. The aforesaid embodiment is merely used to facilitate description of the present invention, but not used as a limit to the invention spirit thereof; any modification to the present invention by a person skilled in the art will be deemed within the spirit scope of the claims of this invention.

What is claimed is:

1. A zoom-lens structure for a camera comprising at least an outer cylinder, an inner cylinder, a fastening ring and a lens mount assembly;

said outer cylinder having a plurality of straight grooves therein for engaging with a plurality of projected keys, respectively, of a fastening ring so as to allow said fastening ring to be movably mounted outside said inner cylinder;

said lens mount assembly including a first lens mount and a second lens mount;

said structure having a plurality of features in that said fastening ring having at least two first positioning pieces to be engaged with positioning grooves of said second lens mount so as to limit said second lens mount from rotating;

at least two second positioning pieces provided on said first lens mount which are also engaged with said positioning grooves and are thus controlled by said second lens mount from being able to rotate, so as to control said lens mount assembly to move back and forth along an optical axis to provide a zoom lens function;

further wherein an inner surface of said inner cylinder is furnished with a plurality of curved grooves for receiving corresponding rolling balls, respectively, provided on outer surfaces of said first lens mount and said second lens mount.

2. A zoom-lens structure for a camera comprising at least an outer cylinder, an inner cylinder, a fastening ring and a lens mount assembly;

said outer cylinder having a plurality of straight grooves therein for engaging with a plurality of projected keys, respectively, of a fastening ring so as to allow said fastening ring to be movably mounted outside said inner cylinder;

said lens mount assembly including a first lens mount and a second lens mount;

said structure having a plurality of feature as in that said fastening ring having at least two first positioning rods to be engaged with positioning grooves of said second lens mount so as to limit said second lens mount from rotating, said positioning grooves being elongated grooves;

at least two second positioning rods provided on said first lens mount which are also engaged with said positioning grooves and are thus controlled by said second lens being able to rotate, so as to control said lens mount assembly to move back and forth along an optical axis to provide a zoom lens function;

further wherein an inner surface of said inner cylinder is furnished with a plurality of curved grooves for receiving corresponding rolling balls, respectively, provided on outer surfaces of said first lens mount and said second lens mount.

3. A zoom-lens structure for a camera as claimed in claim 1, wherein said outer cylinder has an inner surface and both said inner surface of said outer cylinder and said outer surface of said inner cylinder are provided with corresponding and mated threads.

4. A zoom-lens structure for a camera as claimed in claim 1, wherein said inner cylinder has an outer bottom part which is furnished with a vertical gear portion and one side of said outer cylinder has an elongated slot.

* * * * *